United States Patent [19]

Forshee et al.

[11] Patent Number: 4,484,525
[45] Date of Patent: Nov. 27, 1984

[54] PLASTIC MONORAIL CONVEYOR TROLLEY

[75] Inventors: David J. Forshee, Hilton Head Island, S.C.; James S. Salloum, Oxford, Mich.

[73] Assignee: Formall Syn-Trac Systems, Inc., Madison Heights, Mich.

[21] Appl. No.: 395,508

[22] Filed: Jul. 6, 1982

Related U.S. Application Data

[62] Division of Ser. No. 395,509, Jul. 6, 1981.

[51] Int. Cl.³ .............................................. B61B 3/00
[52] U.S. Cl. .................................... 104/95; 105/154; 198/678
[58] Field of Search ............... 198/473, 477, 678, 683, 198/685, 687; 104/91, 93, 95, 99; 308/207 R, 208, 216; 105/154

[56] References Cited

U.S. PATENT DOCUMENTS

| | | | |
|---|---|---|---|
| 644,528 | 2/1900 | Marcy | 308/207 R |
| 935,042 | 9/1909 | Miller | 105/154 |
| 1,390,981 | 9/1921 | Butler | 308/208 |
| 1,429,118 | 9/1922 | Townsend | 308/208 |
| 3,045,808 | 7/1962 | Blanc | 104/95 |
| 3,696,890 | 10/1972 | Armstrong | 104/99 |
| 4,228,738 | 10/1980 | Forshee | 104/95 |

*Primary Examiner*—Joseph E. Valenza
*Assistant Examiner*—Jonathan D. Holmes
*Attorney, Agent, or Firm*—Benjamin W. Colman

[57] ABSTRACT

A plastic conveyor trolley for an inverted T-bar monorail conveyor track is provided. The conveyor trolley comprises a pair of upper track-supported wheels and pairs of lower wheels engageable with and rotatable at times upon the underside surfaces of the track, the upper wheels being rotatably mounted on stub axles secured to the upper portions of the trolley arms, the lower wheels being rotatably mounted on bearing portions integrally formed in intermediate portions of the trolley arms, and a pendant member secured to and between the lower portions of the trolley arms. The lower wheels lie in a plane below and substantially parallel with the plane of the upper wheels.

17 Claims, 9 Drawing Figures

PLASTIC MONORAIL CONVEYOR TROLLEY

CROSS-REFERENCE TO RELATED APPLICATIONS

This application is a division of my co-pending application Ser. No. 395,509 entitled "Plastic Monorail Conveyor Structure", filed July 6, 1981.

BACKGROUND OF THE INVENTION

This invention relates to a monorail conveyor system. Such conveyor systems in the past have been made primarily of steel components suspended from steel supporting members bolted or welded to a building superstructure, the monorail track comprising continuous lengths of I-beam welded together serially at their ends. Conventional monorail systems have included and still comprise steel conveyor trolleys movable upon the I-beam monorail track by means of steel drive chain linkage engageable with the trolleys. This type of monorail conveyor system has been in operation for many years with little, if any, significant modification.

The problems attending such prior art monorail conveyor systems have included high initial material and installation costs, high maintenance and repair costs, very high noise pollution, and a lack of color coding for safety and identification purposes. The limitations and problems apply as much to the conveyor trolley as they do to the monorail track itself. Because the principal components of steel monorail conveyor track must be welded together, skilled workmen at high hourly rates are required to make these installations, to assemble and install the equipment, and to maintain it. Since paint or exterior finishes adhere very poorly to steel surfaces located and operating in areas and atmospheres having a relatively oily or chemical vapor content, it is practically impossible to maintain a color on the monorail components, including the trolleys, which would function as a signal that such apparatus is present and that there may be a danger to personnel in its area of operation. The lack or failure of color coding monorail components also constitutes an insufficieny to provide an identification of those components which are or can be carried by the system. The high decibel noise quotient results in major part from the difficulty in welding and maintaining sections of the monorail in a level attachment of the trolley riding I-beam surfaces, so that a loud clickety-clack occurs each time a steel trolley rides across a juncture of the I-beam monorail track. Where hundreds of such junctures and trolleys are present, the conveyor noise is, in some instances, highly discomforting, significantly decreasing worker efficiency.

SUMMARY OF THE INVENTION

This invention relates to a plastic monorail conveyor trolley having parts hangers suspended therefrom. The component members of the trolley are preferably made of a strong durable plastic material, such for example but not limited to the DuPont Zytel ®ST nylon polyamide produced by the E. I. DuPont DeNemours and Company of Wilmington, De. Some of the components of the trolley can also be made of a DuPont Delrin ® crystalline acetal resin material made by the polymerization of formaldehyde. Either of these materials can be mixed with a fiberglass concentrate to add further strength to the plastic resin. The amount of such fiberglass additive is proportional to the weight load of the conveyor trolleys and the parts to be carried thereby. As the load or weight requirements of these components increase, the percentage of fiberglass used with the resin material may also be increased.

The coefficient of friction of the plastic materials used in the conveyor trolleys is extremely low, therefore lubrication of its moving parts is not required. This feature alone eliminates considerable expensive lubrication equipment, service facilities, installation and maintenance. Removal of lubricants from the site substantially eliminates one major source of contaminants which can drip upon fresh or processed foods carried by or located under or in close proximity of the conveyor system in food processing plants which utilize the plastic trolleys of this invention.

The plastic conveyor trolley is extremely advantageous in areas where severely corrosive chemical vapors are present and where caustic wash solutions are sprayed. These corrosive chemicals will cause a breakdown in most lubrication systems, in turn causing functional damage to the roller bearing assemblies of conventional steel trolleys. Such breakdowns do not occur with trolleys of the instant invention.

In every respect, the plastic conveyor trolleys of this invention permit lower replacement costs for their components and much easier service if repair is required. Removal of defective or failing parts is quickly and easily made by relatively unskilled labor, reducing not only repair and maintenance costs but also downtime for the conveyor system.

In addition, the plastic trolleys effect a tremendous reduction in decible readings in the conveyor zone, a significant advantage in terms of noise abatement and/or pollution. Conventional overhead steel monorail and steel trolley installations become extremely noisy due to mismatches and unevenness in weld joints along the I-beam monorail track, causing considerable personnel discomfort and reducing efficiency in the conveyor zone. The plastic conveyor trolleys will produce little if any noise and little if any damage to the trolleys or suspended parts because of the shock absorption implicit in the plastic trolleys as they ride across mismatched junctures of the monorail track.

Because the plastic resin materials allow for the engineering and production of precision components and assemblies, secondary drilling of holes or alignment of details are unnecessary prior to assembling the components of the trolleys.

Color coding of the plastic trolley assemblies enables parts identification to be made more readily. Such color coding, particularly in bright colors, signals the presence of moving objections and provides a greater measure of safety to personnel in the operating zone of the monorail conveyor system.

BRIEF DESCRIPTION OF THE DRAWINGS

Various further and more specific objects, features and advantages of the invention will appear from the description given below, taken in connection with the accompanying drawings, illustrating by way of example a preferred form of the invention. Reference is here made to the drawings annexed hereto forming an integral part of this specification.

DESCRIPTION OF THE PREFERRED EMBODIMENTS

Figure 1:
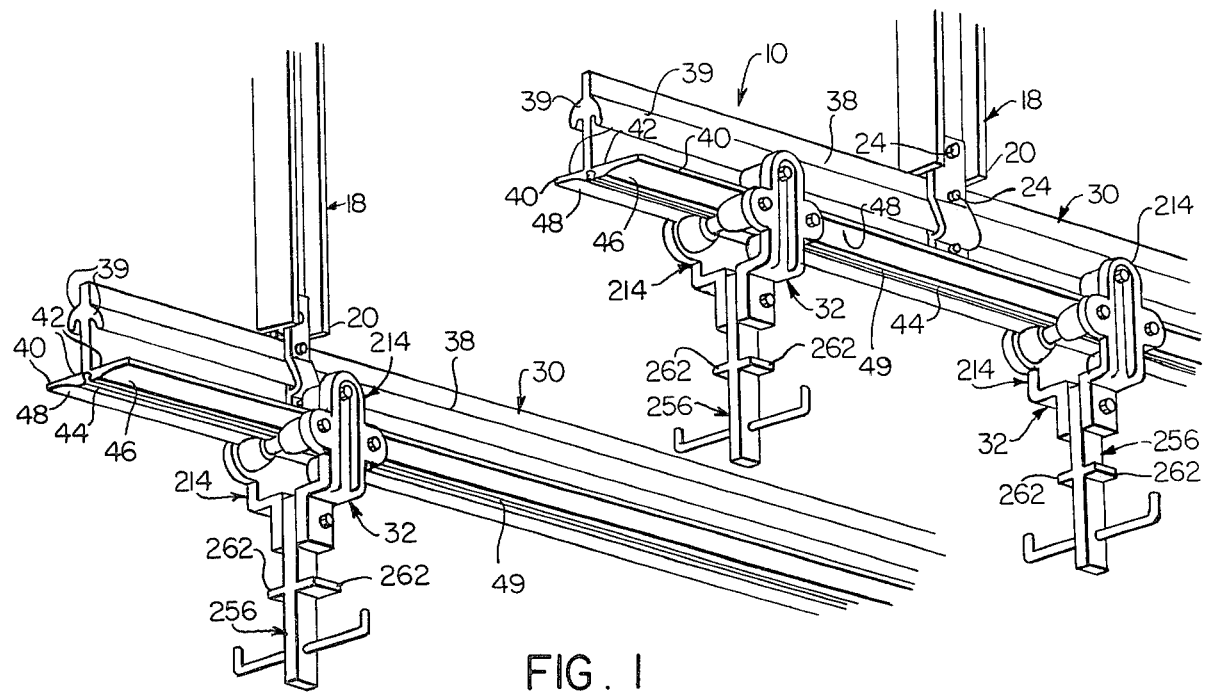
FIG. 1 is a perspective view of a T-bar monorail conveyor track supporting plastic conveyor trolleys embodying the invention.
Figure 2:
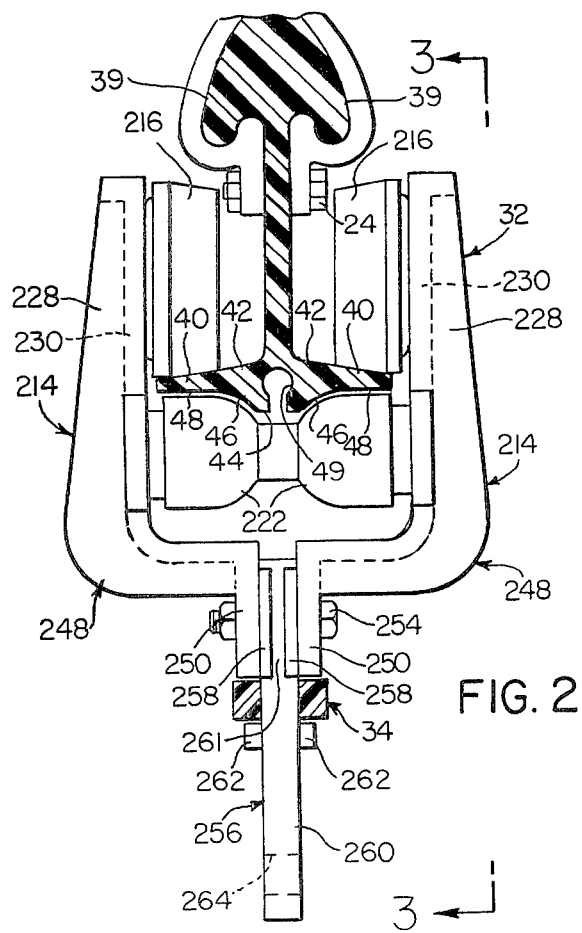
FIG. 2 is a front elevational view of the plastic trolley for the plastic T-bar monorail track.
Figure 3:
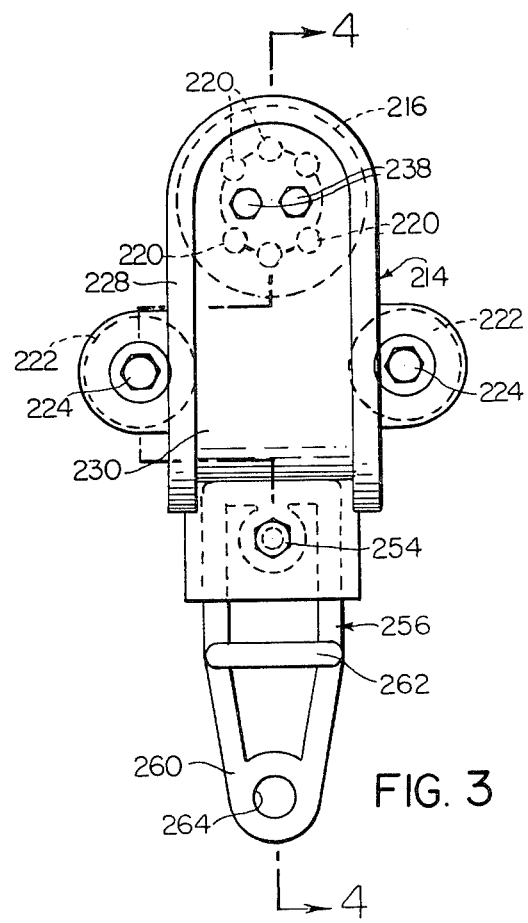
FIG. 3 is a side elevational view taken substantially on the line 3—3 of FIG. 2.
Figure 4:
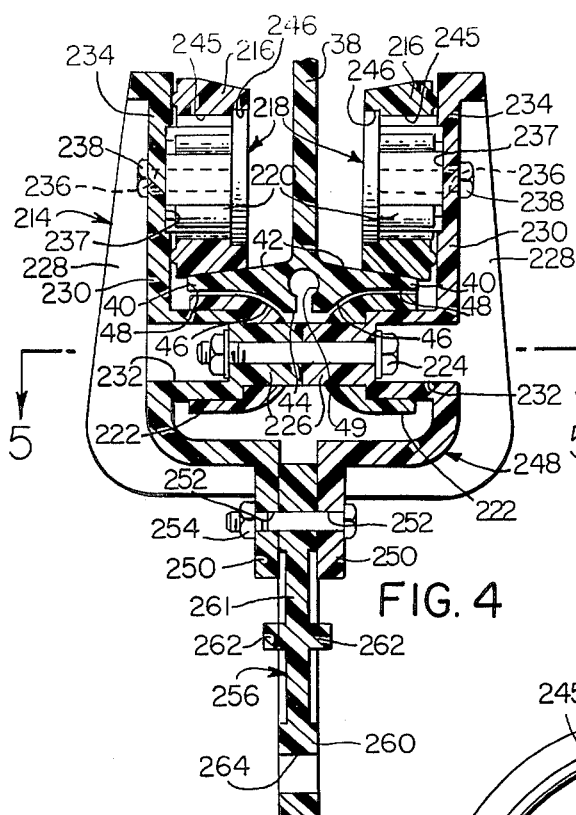
FIG. 4 is a vertical sectional view taken substantially on the line 4—4 of FIG. 3.
Figure 5:
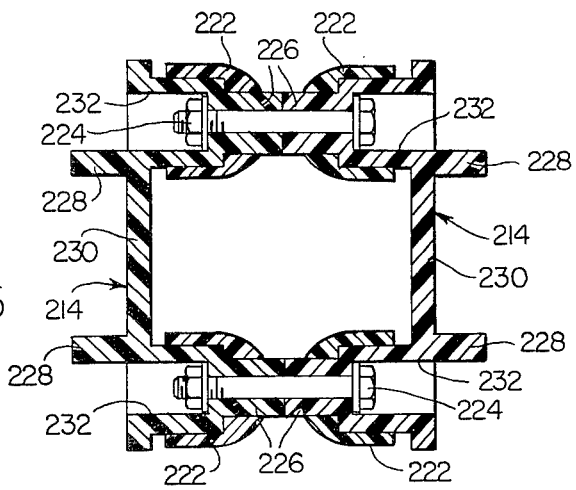
FIG. 5 is a horizontal sectional view taken substantially on the line 5—5 of FIG. 4.
Figure 7:
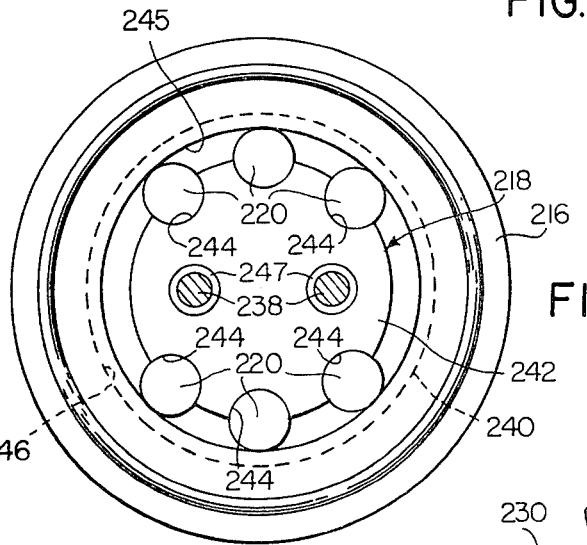
FIG. 7 is an inside elevational view of a stub axle with bearings and the upper wheel supported thereon.
Figure 6:
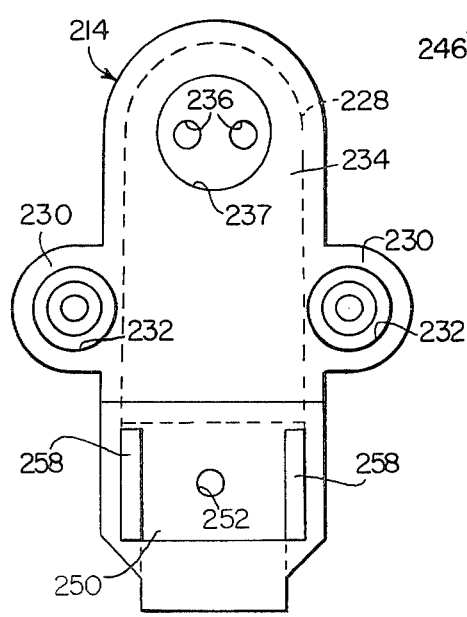
FIG. 6 is an inside elevational view of the trolley arm.
Figure 8:
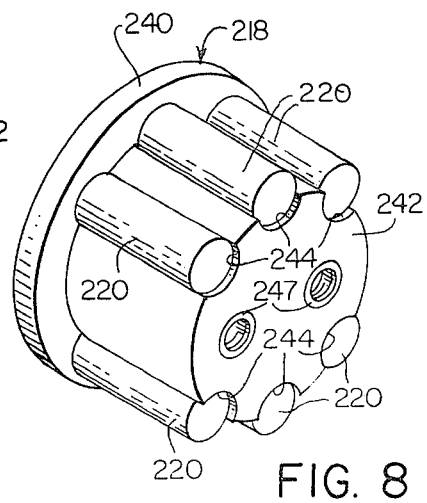
FIG. 8 is a perspective view of the stub axle portion and bearings illustrated in FIG. 7.
Figure 9:
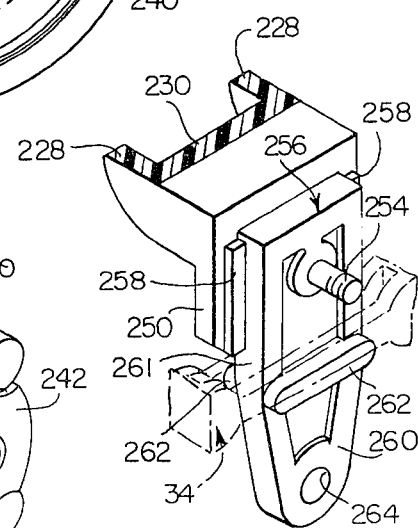
FIG. 9 is a perspective view of the pendant member supported on and between the lower portions of the trolley arms.

A preferred embodiment of the invention, illustrated in the drawings, comprises a plastic monorail conveyor structure 10 suspended from roof trusses by a supporting structure including structural and bracket members 18 and 20 secured to an inverted T-bar shaped monorail track 30 by bolt, washer and nut fasteners 24.

The inverted plastic T-bar track section 30 comprises a planar upstanding stem 38 having lateral lobes 39,39 on each side thereof and laterally directed flanges 40,40 lying substantially in a plane adjacent its lower end. The upper flange surfaces 42,42 are inclined slightly downwardly, at an angle of approximately 7 degrees to the horizontal plane. The lower distal end of the stem is designed with a longitudinally extending medial depending web portion 44 intermediate upwardly outwardly curved surfaces 46,46 blending into substantially horizontal lateral surfaces 48,48. The web portion 44 has a medial longitudinally extending key slot 49 for reception of a plastic pin 51 press fit into the end portions of abutting track sections to prevent sideways misalignment.

The plastic T-bar monorail track sections 30 are straight sections connected together serially at abutting ends by splice fittings, curved sections (not shown) being connected to straight sections as disclosed in my co-pending application Ser. No. 395,509.

The plastic conveyor trolleys 32 carried by the T-bar monorail track, each comprises a pair of complementary side arms 214,214, the upper trolley wheels 216 rotatably mounted on the stub axles 218 supporting bearings 220, the four lower wheels 222, and fasteners 224 securing the side arms together in mating facing relationship at the lower wheel bearings 226. The lower wheels 222 are at times engaged with and rotatable upon the underside surfaces 46 and 48 of the T-bar flanges 40,40, particularly when the trolleys are travelling on an upwardly inclined portion of the monorail track 30. The trolley side arms 214 are each provided with lateral flanges 228 extending outwardly from the body portion 230 having recesses 232,232 for the admission of fasteners 224. The upper portion 234 of the side arm body is provided with openings 236 for admission of fasteners 238 therethrough for securement of the stub axle 218 to the upper body portion 234 at its counterbore or recess 237.

The plastic stub axle 218 is provided with a distal flange 240, the axle body 242 and a plurality of axially extending recesses 244 in and about the periphery of the body for the bearings 220. The upper trolley wheels 216 are rotatably mounted and supported at their bores 245 upon the bearings 220 and retained thereon by the stub axle flange 240 seated in the wheel recess or counterbore 246. The bearings 220 are of a length slightly less than the linear length of the bearing recesses 232, and the stub axle body 242 may be fitted with threaded brass inserts 247 to threadedly receive the bolt fasteners 238.

The lower portion 248 of the side arm 214 is provided with depending flange 250 having a bore 252 therethrough for the fastener 254 by which the pendant member 256 is suspended. The side arm depending flange 250 is also provided with inwardly facing ribs 258 spaced apart from each other for admission and securement of the pendant 256 therebetween, to limit and prevent rotation of the pendant member in parts hanger supporting operation. Parts hanger devices are suspended from the lower portion 260 of the pendants in accordance with conventional practice. The pendant 256 is also provided with generally horizontally extending ribs 262, 262 on either side thereof, upon which the drive chain medial link 190 rests. A fastener to suspend a parts hanger is passed through the opening 264 in the lower pendant portion 260 of the trolley for attachment of the parts hanger therefrom.

The plastic trolley 32 comprises a group of plastic components which are preferably made by the molding process as integrally molded, unitary elements. These include the side arms 214, the upper wheels 216, the stub axles 218 and bearings 220, the lower T-bar engaging wheels 222, and the pendant member 256, operatively secured together by conventional fasteners 224, 238 and 254. These components and elements are preferably made of the Zytel or Delrin plastic materials, or other suitable equivalent materials, as integrally molded, unitary components and elements.

Having disclosed herein a certain particular preferred embodiment of the invention for purposes of explanation, further modifications or variations thereof, after study of this specification, may occur or become apparent to persons skilled in the art to which the invention pertains. Reference should be had to the attached claims in determining the scope of the invention.

I claim:

1. In a trolley assembly for operation on an inverted T-bar monorail rack comprising longitudinally abutting sections having a longitudinally extending upstanding stem and a laterally outwardly extending flange from each side of said stem, said flanges lying substantially in a plane transversely of said stem, the upper surfaces of said flanges being inclined slightly downwardly from said stem, each said track section having a substantially medial longitudinally extending web portion between said flanges therebelow, each said flange having an upwardly laterally outwardly curved underside surface portion adjacent and at each side of said web portion, blending into a substantially planar underside surface portion extending laterally outwardly to the distal edge of said flange, said trolley assembly comprising a pair of complementary, opposedly facing, plastic easily detachably conjoined trolley arms having an upper portion, an intermediate portion and a lower end portion, a plastic trolley upper wheel freely rotatable on each said trolley arm and in rolling bearing contact upon said flange upper surfaces, a plastic stub axle for each said trolley upper wheel easily removably attached to and adjacent the inward face of the upper portion of each said trolley arm, a pair of plastic trolley lower wheels easily removably and rotatably mounted on each said trolley arm in parallel spaced apart relationship, abutting bearing portions for each said pair of lower wheels projecting inwardly from the intermediate portion of each said trolley arm, means detachably connecting said trolley arms together at said abutting bearing portions, said bearing portions for each said pair of trolley lower wheels being aligned axially and in abutting inner end-to-end relationship, means intermediate the ends of said bearing portions limiting laterally outward travel of said trolley wheels, said upwardly laterally outwardly curved underside surface portions of said flanges limiting laterally inward travel of said lower wheels, said two pairs of lower wheels rotatable in a common plane below and substantially parallel with the plane of said upper wheels, said lower wheels being shaped to cooperatively function with said track underside surface portions, and a pendant member removably secured to the conjoined lower end portions of said trolley arms.

2. The trolley assembly defined in claim 1, wherein said stub axle has a body portion and an annular flange retainer for said trolley upper wheel at the distal end of said body portion.

3. The trolley assembly defined in claim 2, wherein the proximal end of said stub axle body portion is secured to and upon said trolley arm upper portion.

4. The trolley assembly defined in claim 2, including a plurality of plastic cylindrical roller bearings freely rotatably disposed in the perimetric surface of said stub axle body portion, said trolley upper wheel being freely rotatable upon said roller bearings.

5. The trolley assembly defined in claim 4, wherein said roller bearings are disposed in axially parallel relationship about and in the perimetric surface of said stub axle body portion.

6. The trolley assembly defined in claim 5, wherein said perimetric surface is provided with a plurality of axially parallel radially spaced apart longitudinally extending recesses seating said cylindrical roller bearings for rotation therein.

7. The trolley assembly defined in claim 6, wherein said recesses are semi-circular or arcuate in cross-sectional configuration.

8. The trolley assembly defined in claim 6, wherein said recesses are of a length slightly greater than the length of said roller bearings seated and rotatable therein.

9. The trolley assembly defined in claim 6, wherein the radially outward surfaces of said roller bearings, when seated in said stub axle perimetric surface recesses, define a cylindrical surface of revolution about said bearings concentric with the axis of said stub axle.

10. The trolley assembly defined in claim 6, wherein the radially outward surfaces of said roller bearings, when seated in said stub axle perimetric surface recesses, define a circle of rotation extending outwardly of the perimeter of said stub axle and within the inner cylindrical bore of said trolley upper wheel.

11. The trolley assembly defined in claim 6, wherein said recesses extend from the proximal end of said stub axle body portion to said annular flange retainer.

12. The trolley assembly defined in claim 11, wherein said annular flange retainer secures said trolley upper wheel for rotation on said roller bearings when said stub axle is secured to said trolley arm upper portion inward face.

13. The trolley assembly defined in claim 6, wherein said stub axle body portion functions as a support bearing or fixed race for said roller bearings.

14. The trolley assembly defined in claim 1, and including fastening means easily removably securing the proximal end of said stub axle to said trolley arm upper portion inward face, fastening means easily removably securing each pair of said bearing portions of said trolley arms in axial parallel alignment, and fastening means securing said pendant to and between said trolley arm lower portions.

15. The trolley assembly defined in claim 14, wherein said stub axle body portion is provided with threaded metallic inserts for said fastening means.

16. The trolley assembly defined in claim 1, wherein each said pair of parallel spaced apart trolley lower wheels rotatably mounted on said bearing portions of one said trolley arm being engageable with and rotatable upon the underside surface of one said T-bar monorail flange.

17. The trolley assembly defined in claim 1, wherein said lower wheels are shaped to conform to said curved underside surface portions.

* * * * *